(12) United States Patent
Tanaka et al.

(10) Patent No.: US 11,332,115 B2
(45) Date of Patent: May 17, 2022

(54) POWER REGENERATION SYSTEM OF WORK VEHICLE

(71) Applicant: HITACHI CONSTRUCTION MACHINERY CO., LTD., Tokyo (JP)

(72) Inventors: Shintarou Tanaka, Tokyo (JP); Masatsugu Arai, Tsuchiura (JP); Naoki Fukuda, Tsuchiura (JP); Takaaki Tanaka, Tsuchiura (JP); Yukiaki Shimizu, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 274 days.

(21) Appl. No.: 16/631,587

(22) PCT Filed: Jun. 4, 2018

(86) PCT No.: PCT/JP2018/021375
§ 371 (c)(1),
(2) Date: Jan. 16, 2020

(87) PCT Pub. No.: WO2019/064703
PCT Pub. Date: Apr. 4, 2019

(65) Prior Publication Data
US 2020/0180588 A1 Jun. 11, 2020

(30) Foreign Application Priority Data
Sep. 29, 2017 (JP) .............................. JP2017-191554

(51) Int. Cl.
*B60W 10/08* (2006.01)
*B60L 1/00* (2006.01)

(52) U.S. Cl.
CPC .............. *B60W 10/08* (2013.01); *B60L 1/003* (2013.01); *B60L 1/20* (2013.01); *B60L 2200/36* (2013.01);
(Continued)

(58) Field of Classification Search
None
See application file for complete search history.

(56) References Cited

U.S. PATENT DOCUMENTS

| 2008/0011528 A1* | 1/2008 | Verbrugge | B60L 50/61 180/65.29 |
| 2010/0051359 A1* | 3/2010 | Fushiki | B60L 50/61 180/65.1 |
| 2018/0056790 A1* | 3/2018 | Symanow | B60K 6/448 |

FOREIGN PATENT DOCUMENTS

| JP | 9-215362 A | 8/1997 |
| JP | 10-174201 A | 6/1998 |

(Continued)

OTHER PUBLICATIONS

Japanese Office Action received in corresponding Japanese Application No. 2017-191554 dated Dec. 8, 2020.

(Continued)

*Primary Examiner* — Todd Melton
*Assistant Examiner* — Jason R Roberson
(74) *Attorney, Agent, or Firm* — Mattingly & Malur, PC

(57) ABSTRACT

A power regeneration system of a work vehicle includes: a first generator (12) and a second generator (31) that are driven by an engine (11); a first electric circuit (C1) for supplying electric power to traveling motors (10L, 10R); a second electric circuit (C2) for supplying electric power to an auxiliary device (35); a voltage step down converter (21) providing electric power from the first electric circuit to the second electric circuit; and a controller (51) that determines whether a travel mode of the work vehicle is a powering mode or a regeneration mode in order to control driving of the voltage step down converter. If the travel mode is the regeneration mode, the controller provides the regenerative power from the first electric circuit through the voltage step (Continued)

down converter to the second electric circuit, in order to drive the auxiliary device with the regenerative power.

5 Claims, 11 Drawing Sheets

(52) U.S. Cl.
CPC ... *B60L 2240/421* (2013.01); *B60L 2240/423* (2013.01)

(56) References Cited

FOREIGN PATENT DOCUMENTS

| JP | 2000-299901 A | 10/2000 |
|---|---|---|
| JP | 2006-280110 A | 10/2006 |
| JP | 2012-121555 A | 6/2012 |
| JP | 2014-072913 A | 4/2014 |
| JP | 2014-176167 A | 9/2014 |
| JP | 2016-86580 A | 5/2016 |

OTHER PUBLICATIONS

Extended European Search Report received in corresponding European Application No. 18860575.2 dated Feb. 12, 2021.
International Search Report of PCT/JP2018/021375 dated Sep. 4, 2018.

\* cited by examiner

POWER REGENERATION SYSTEM OF WORK VEHICLE

TECHNICAL FIELD

The present invention relates to a power regeneration system of a work vehicle.

BACKGROUND ART

As background art of the present invention, for example, Patent Literature 1 discloses "a hybrid dump truck including: drive motors that drive drive wheels; an engine that rotationally drives a generator for power generation; a rectifier that converts an alternating current output from the generator into a direct current; an inverter that is connected to a DC output line of the rectifier and controls the rotational speeds of the drive motors; a battery that is connected in parallel to the DC output line of the rectifier and an input power-source line of the inverter; and a controller that outputs a speed instruction signal to the inverter according to an acceleration quantity, in which each drive motor has maximum output greater than the engine, and the controller has battery charge/discharge controlling means that, when a larger amount of power than that generated at maximum output of the engine is required for driving of the drive motors, outputs an instruction to a battery open/close switch to allow the battery to discharge in order to use the discharge current to assist the drive power of the drive motors" (see Abstract).

CITATION LIST

Patent Literature

Patent Literature 1: JP-A-No. 2000-299901

SUMMARY OF INVENTION

Technical Problem

In Patent Literature 1, many batteries must be connected in series because the batteries (e.g., lithium ion batteries, lead-acid batteries and the like) are configured to be mounted in a high voltage DC line in an electric circuit. Specifically, in Patent Literature 1, as the batteries increase in number, the weight of the dump truck is increased, resulting in a problem of a decrease in fuel efficiency.

Accordingly, there is a need in a power regeneration system for work vehicles for a technique to enable an effective use of regenerative power without an electric storage device, such as a battery and the like, mounted in a high voltage DC line.

Solution to Problem

To address this problem, in representative embodiments of the present invention, a power regeneration system of a work vehicle is provided which includes: a first generator and a second generator that are driven by an engine; a first electric circuit for supplying electric power generated at the first generator, to traveling motors connected to drive wheels of the work vehicle; a second electric circuit for supplying electric power generated at the second generator, to an auxiliary device of the work vehicle; a voltage step down converter that is connected at a high voltage side to the first electric circuit and connected at a low voltage side to the second electric circuit, the voltage step down converter providing electric power from the first electric circuit to the second electric circuit; and a controller that determines whether a travel mode of the work vehicle is a powering mode or a regeneration mode in order to control driving of the voltage step down converter, the powering mode corresponding to a normal traveling state, the regeneration mode corresponding to a traveling state where regenerative power is generated. If the travel mode of the work vehicle is the regeneration mode, the controller controls driving of the voltage step down converter to provide the regenerative power from the first electric circuit through the voltage step down converter to the second electric circuit, in order to drive the auxiliary device with the regenerative power.

Advantageous Effects of Invention

According to the present invention, in a power regeneration system of a work vehicle, an effective use of regenerative power is enabled without an electric storage device, such as a battery and the like, mounted in a high voltage DC line. It is noted that the above and other aspects, features and advantages will be more apparent from the following description of embodiments.

DESCRIPTION OF EMBODIMENTS

Embodiments according to the present invention will now be described with reference to the accompanying drawings. It is noted that, throughout the drawings, like reference signs are used to refer to like elements, and a repetitive description thereof is omitted.

First Embodiment

A first embodiment of a power regeneration system of a work vehicle according to the present invention will described below. The power regeneration system according to the first embodiment of the present invention is described as an example of applying a power regeneration system to a dump truck which is a representative example of work vehicles.

Outer Appearance of Dump Truck 100

Figure 1:
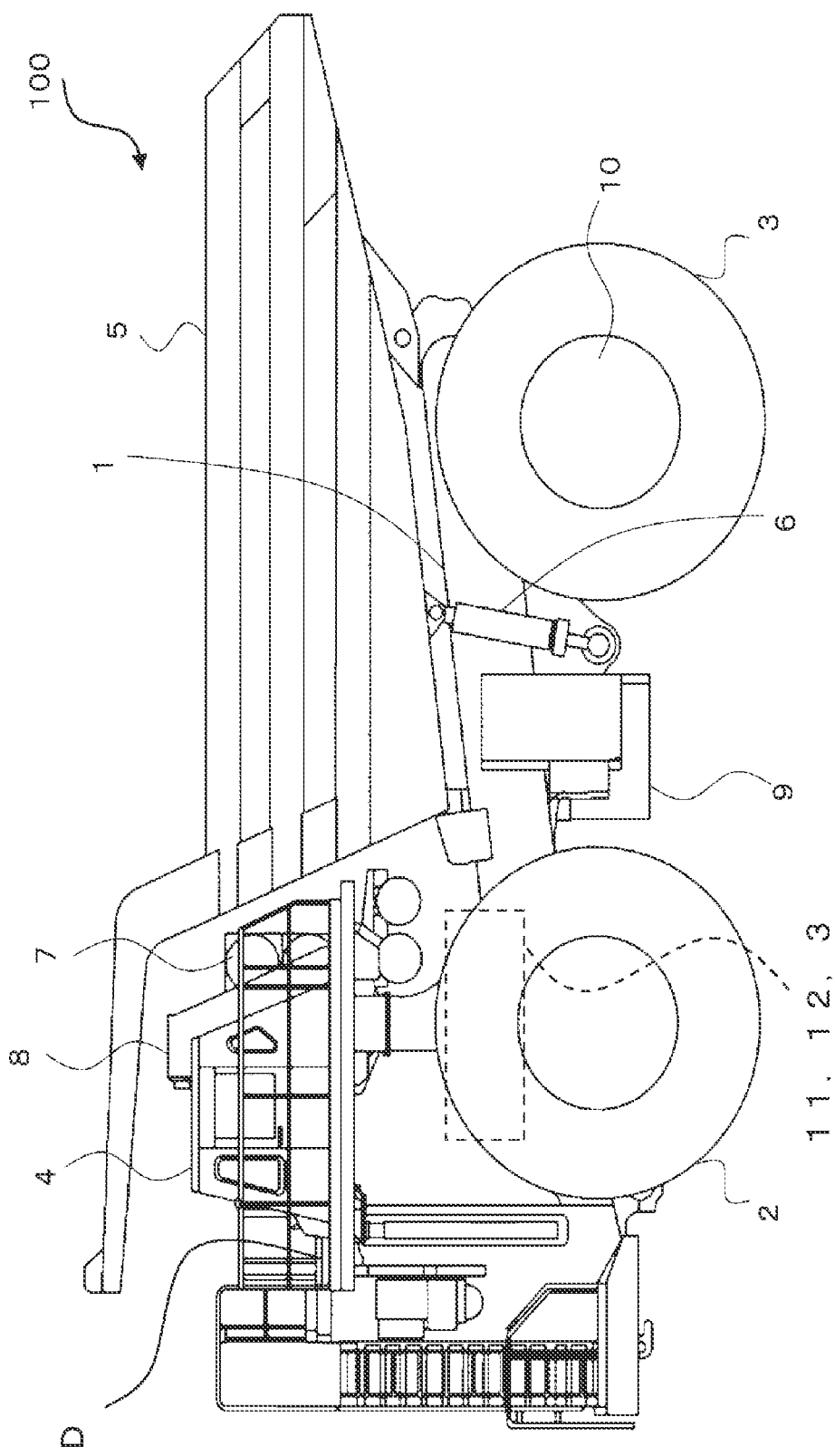
FIG. 1 is a side view of a dump truck which is a representative example of work vehicles.

FIG. 1 is a side view of a dump truck which is a representative example of work vehicles. The dump truck 100 illustrated in FIG. 1, which is used particularly in mine application, includes a frame 1 mounted thereon with a body 5 for loading of earth, sands and the like, in which the frame 1 and the body 5 are coupled by a pair of left and right hoist cylinders 6. The frame 1 is also mounted with a pair of left and right front wheels 2, a pair of left and right rear wheels 3, a fuel tank 9, and the like, through mechanism components which are not shown. In a rotation axis portion of each rear wheel 3, a traveling motor 10 for driving the rear wheel 3, and a reduction gear for adjusting the rotational speed of the rear wheel 3 are incorporated.

The frame 1 is further mounted with a deck D on which an operator can walk. Installed on the deck D are: a cab 4 into which the operator climbs for operation of the dump truck 100; a control cabinet 8 incorporating various electric power apparatuses; and a plurality of grid boxes 7 for dissipation of excess energy as heat. Installed in an area hidden behind the front wheel 2 in FIG. 1 are: an engine 11; a first generator 12 serving as a power source for the traveling motors 10L, 10R for mainly driving the rear wheels 3; a second generator 31 serving as a power source for fan motors (auxiliary motor) 35 which are mechanically connected to fans 36 for mainly cooling the interiors of the grid boxes 7; a main pump, although not shown in the figures, serving as a hydraulic source mainly for hydraulic apparatus; and the like.

Method for Operating Dump Truck 100

Within the cab 4, although not shown in the figures, an accelerator pedal, a brake pedal, a hoist pedal, and a steering wheel are mounted. The operator can operate the accelerator pedal or the brake pedal within the cab 4 to control the acceleration force or the braking force of the dump truck 100. Further, the operator performs the steering operation of the dump truck 100 by turning the steering wheel to the left or the right, and performs the dumping operation by depressing the hoist pedal so that the hoist cylinders 6 raise the body 5. It is noted that the hydraulic systems for performing the steering operation and the dumping operation are well known and thus not detailed.

Configuration of Power Regeneration System of Dump Truck 100

Figure 2:
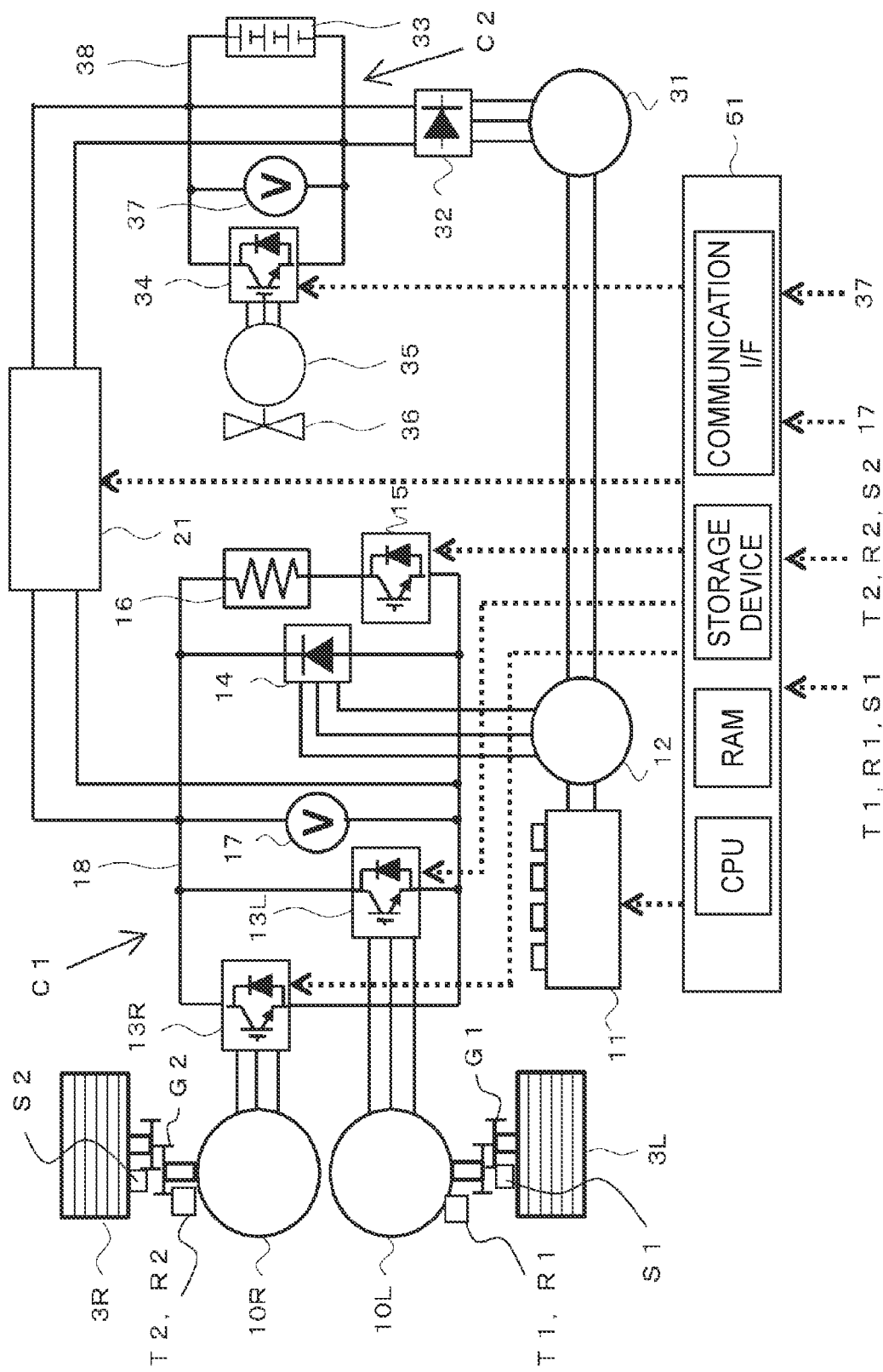
FIG. 2 is a schematic configuration diagram of a power regeneration system of a dump truck.

FIG. 2 is a schematic configuration diagram of the power regeneration system of a dump truck. As illustrated in FIG. 2, the power regeneration system of the dump truck 100 includes the first generator 12 and the second generator 31 which are driven by the engine 11, a first electric circuit C1, a second electric circuit C2, a DC-DC converter 21 as a voltage step down converter, and a controller 51.

The first electric circuit C1 supplies the power generated by the first generator 12 to the traveling motors 10L, 10R connected to the rear wheels (drive wheels) 3L, 3R of the dump truck 100. The electric circuit C2 supplies the power generated by the second generator 31 to each fan motor (auxiliary motor) 35 connected to the fan (auxiliary device) 36 of the dump truck 100.

The DC-DC converter 21 is connected at the high voltage side to the first electric circuit C1 and at the low voltage side to the second electric circuit C2. And, the DC-DC converter 21 provides power from the first electric circuit C1 to the second electric circuit C2. The controller 51 controls driving of the DC-DC converter 21. To control driving of the DC-DC converter 21, as described later in detail, the controller 51 determines whether the travel mode of the dump truck 100 is in a powering mode corresponding to a normal traveling state or a regeneration mode corresponding to a traveling state where regenerative power is generated.

In the first electric circuit C1, three phase AC output of the first generator 12 is input to the traveling motor inverters (first power conversion devices) 13L, 13R through a first rectifier circuit 14 which is a diode bridge. Outputs of the traveling motor inverters 13L, 13R are electrically connected to the travelling motors 10L, 10R, respectively. It is noted that, as the first rectifier circuit 14, for example, a bidirectional electric conversion device such as a three phase inverter may be used in lieu of the diode bridge.

Also, shafts of the traveling motors 10L, 10R are mechanically connected to the rear wheels 3L, 3R through the reduction gears G1, G2, respectively, so that the torques of the travelling motors 10L, 10R are transferred to the rear wheels 3L, 3R through the reduction gears G1, G2.

A grid resistance box (resistor) 16 and a chopper 15 are connected to a high voltage DC line 18 which is a DC input section of the traveling motor inverters 13L, 13R, on the output side of the first rectifier circuit 14. Here, an electric storage device for storing power regenerated at the traveling motors 10L, 10R is not connected to the first electric circuit C1. In the embodiment, thus, the copper 15 is actuated so that the regenerative power regenerated at the traveling motors 10L, 10R is dissipated into the atmosphere through the grid resistance box 16 in the grid boxes 7, without being stored in the electric storage device. Also a first voltage detector 17 detects a first voltage value of the high voltage DC line 18 and outputs it to the controller 51.

Meanwhile, in the second electric circuit C2, a three phase AC output of the second generator 31 is connected to the fan motor inverter (second power conversion device) 34 through a second rectifier circuit 32 which is a diode bridge. An output of the fan motor inverter 34 is connected to a plurality of fan motors 35. Also, an output shaft of each fan motor 35 is connected to the fan 36. And, a second voltage detector 37 detects a second voltage value of an auxiliary device DC line 38 and outputs it to the controller 51. Here, in the first embodiment, a battery 33 is mounted for stable power of the auxiliary device DC line 38, but the battery 33 is not necessarily required. It is noted that, in the first embodiment, as an electric component connected to the auxiliary device DC line 38, only the fan motor inverter 34 is illustrated in the figure, but, for example, an electric conversion device performing power conversion of DC voltage such as an air conditioner inverter or an excitation power source of the first generator may be connected to the auxiliary device DC line 38.

As illustrated in FIG. 2, the controller 51 is configured by use of hardware including: a CPU (Central Processing Unit); a storage device such as HDD (Hard Disc Drive), ROM (Read Only Memory) for storing various programs to execute processing by the CPU, and the like; and RAM (Random Access Memory) providing a work area for the CPU to execute processing.

The controller 51 receives as input: a voltage value $V_{HV}$ of the first electric circuit C1 detected by the first voltage detector 17; a current of the first electric circuit C1 detected by a first current detector which is not shown; torque T of the traveling motors 10L, 10R detected by torque sensors T1, T2; rotational speeds ω of the traveling motors 10L, 10R detected by rotational speed sensors R1, R2; a vehicle speed V of the dump truck 100 detected by speed sensors S1, S2; a voltage value $V_{LV}$ of the second electric circuit C2 detected by the second voltage detector 37; and a current of the second electric circuit C2 detected by a second current detector which is not shown.

The controller 51 outputs to the DC-DC converter 21 a control signal for controlling the voltage of the auxiliary device DC line 38 which is an output voltage of the DC-DC converter 21, based on the incoming current and voltage in the first electric circuit C1, the current and voltage in the second electric circuit C2, the torque T of the traveling motors 10L, 10R, and the vehicle speed V of the dump truck 100.

Based on the state of the dump truck 100 and the operational input of the operator, the controller 51 also outputs an on/off signal as appropriate to each of semiconductor switches (not shown) of the engine 11, the traveling motor inverters 13L, 13R, the chopper 15 and the fan motor inverter 34 so that the traveling motors 10L, 10R, the grid resistance box 16 and the fan motors 35 are driven at appropriate timing in order to control the flow of current in the first electric circuit C1 and the second electric circuit C2.

Upon the engine 11 driving the first generator 12, the three phase AC voltage generated is converted to a DC voltage by the first rectifier circuit 14, which then is input to the traveling motor inverters 13L, 13R. In this state, upon the operator depressing the accelerator pedal, a control signal for acceleration is input from the controller 51 to the traveling motor inverters 13L, 13R, so that power is supplied to the traveling motors 10L, 10R. By the power, the traveling motors 10L, 10R drive the rear wheels 3L, 3R through the reduction gears G1, G2 to move the dump truck 100 forward or backward.

Meanwhile, when the operator depresses the brake pedal or in the braking operation for downhill travel, a control signal for deceleration is input from the controller 51 to the traveling motor inverters 13L, 13R, so that the traveling motors 10L, 10R convert the kinetic energy of the dump truck 100 into electrical energy. As another stated, the traveling motors 10L, 10R perform operation as generators.

The power generated at this time (regenerative power) is stored as a DC voltage in the high voltage DC line 18 of the traveling motor inverters 13L, 13R, but because there is a limit to how the power can be stored with safety, a discharging function is necessary. To address this, when a DC voltage exceeds a reference value, the controller 51 effects the operation of the chopper 15 connected to the high voltage DC line 18. This allows the flow of electrical energy from the first generator 12 toward the traveling motors 10L, 10R to be switched to the flow from the traveling motors 10L, 10R toward the grid resistance box 16, so that the DC voltage is applied to the grid resistance box 16, thereby enabling consumption of the electrical energy as heat.

Typically, the heat of the grid resistance box 16 is naturally air cooled by ambient atmosphere. However, if heat generating energy is high, the grid resistance box 16 may rise in temperature and this is likely to cause damage resulting from high temperature. To avoid this, the controller 51 drives the fans 36 to cool the grid resistance box 16 by forced air cooling.

Meanwhile, upon the engine 11 driving the second generator 31, the three phase AC voltage generated is converted to a DC voltage by the second rectifier circuit 32, which then is input to the fan motor inverter 34. If the grid resistance box 16 is required to be cooled, a control signal for driving each fan motor 35 is input from the controller 51 to the fan motor inverter 34, so that the fans 36 rotate. Then, wind generated by the rotation of the fans 36 cools the grid resistance box 16.

Figure 3:
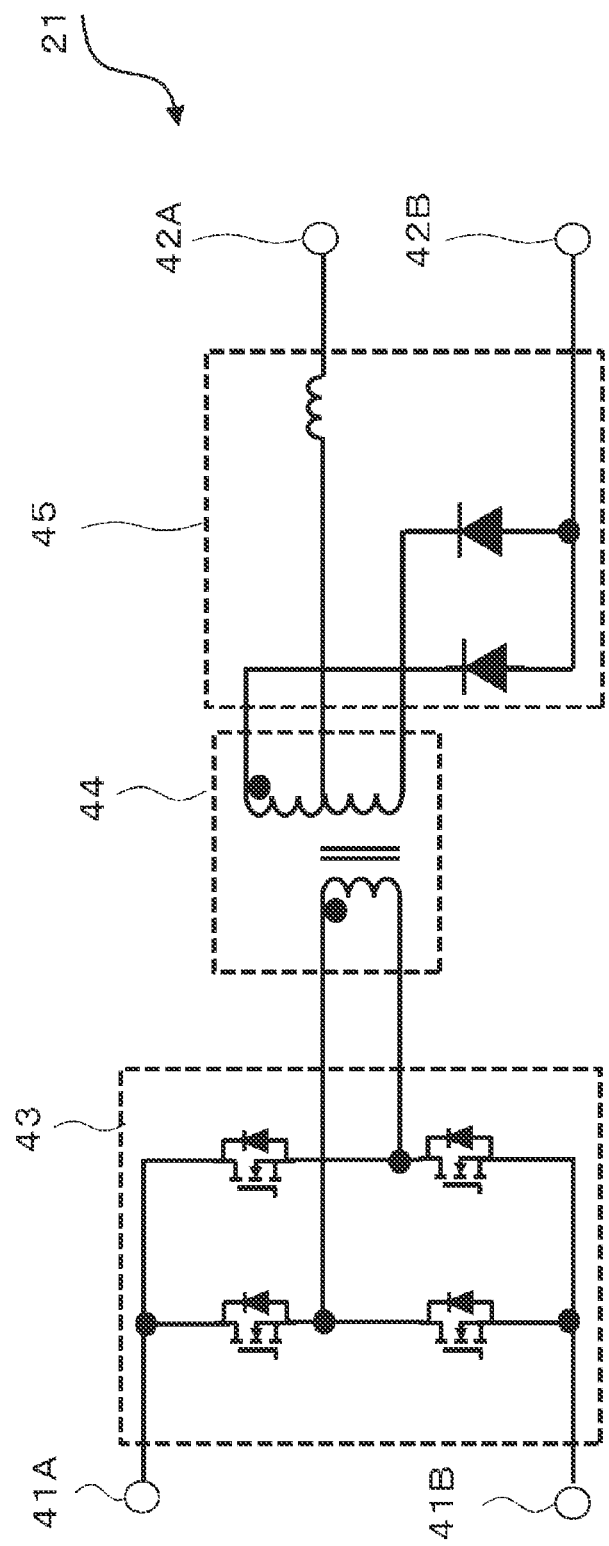
FIG. 3 is a schematic configuration diagram of a DC-DC converter.

Next, the configuration of the DC-DC converter 21 is described. FIG. 3 is a schematic configuration diagram of the DC-DC converter 21. As illustrated in FIG. 3, the high voltage DC line 18 is connected to high voltage side input terminals 41A, 41B of the DC-DC converter 21. The input terminals 41A, 41B of the DC-DC converter 21 are connected to a voltage inverter 43 which converts DC power to an AC signal such as with a rectangular waveform or the like, the voltage inverter 43 being comprised of, for example, a circuit, such as an insulated, voltage full bridge or the like. The voltage inverter 43 is connected to the primary winding of a transformer 44 with an insulation function such as, e.g., of a center tap type or the like, in which the AC signal generated at the voltage inverter 43 is transformed according to a turn ratio of the transformer 44 before being output to the secondary winding of the transformer 44. The secondary winding of the transformer 44 is connected to a rectifier circuit 45 which is composed of, for example, a diode and a choke coil. The AC signal output to the secondary winding of the transformer 44 is converted to DC voltage through the rectifier circuit 45 and then output to low-voltage side output terminals 42A, 42B. The output terminals 42A, 42B are connected to the auxiliary device DC line 38, so that the DC power is provided to the auxiliary device DC line 38.

It is noted that the circuit configuration of the DC-DC converter 21 may be a circuit configuration in which a voltage of the high voltage DC line 18 which is high voltage is converted to a voltage of the auxiliary device DC line 38 which is low voltage. Also, FIG. 3 illustrates use of only one DC-DC converter, but a plurality of DC-DC converters may be connected in multiple parallel or multiple series. For information, in the embodiment, a voltage at the input terminals 41A, 41B on the high voltage side ranges from about 1800 V to about 2000 V, and a voltage at the output terminals 42A, 42B on the low voltage side ranges from about 320V to about 350 V. In this manner, the DC-DC converter 21 functions as voltage step down means that steps down voltage from a high voltage side to a low voltage side.

In this manner, in the braking operation of the dump truck 100, the controller 51 causes the travelling motors 10L, 10R to operate as generators to convert the kinetic energy into electrical energy, and then the electrical energy is converted to thermal energy through the grid resistance box 16 in order to obtain a braking force. Also, the generated heat is dissipated into the atmosphere through the forced air cooling by the fans 36 in order to ensure a stable braking force.

It is noted that, although not shown, the dump truck 100 has a mechanical brake system in addition to a retarder, and the speed of the vehicle body can be decreased by separately using the electrical deceleration (retarder brake) and the mechanical brake system depending on circumstances.

Control by Controller 51

Figure 4:
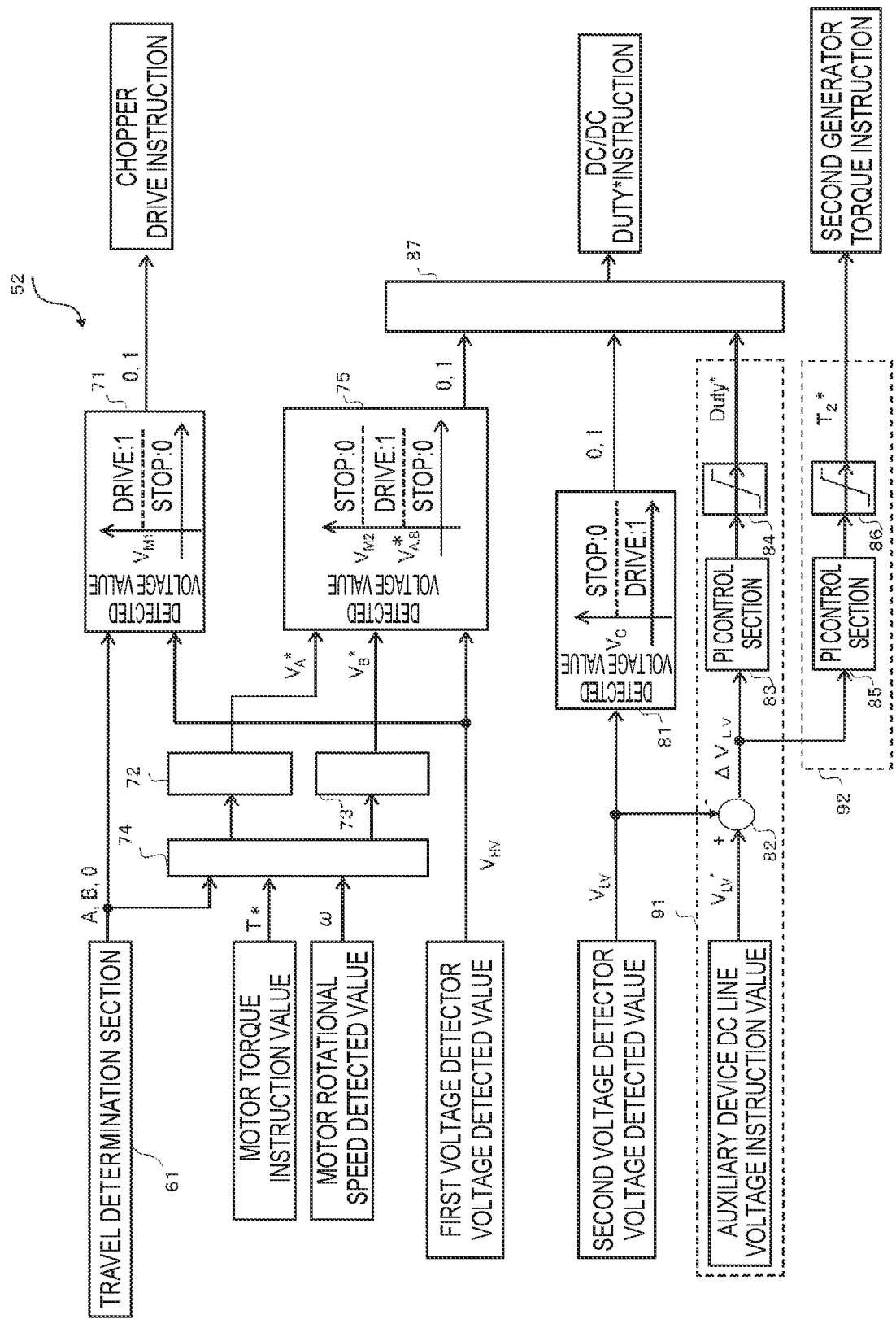
FIG. 4 is a block diagram illustrating control of each apparatus by a controller.
Figure 5:
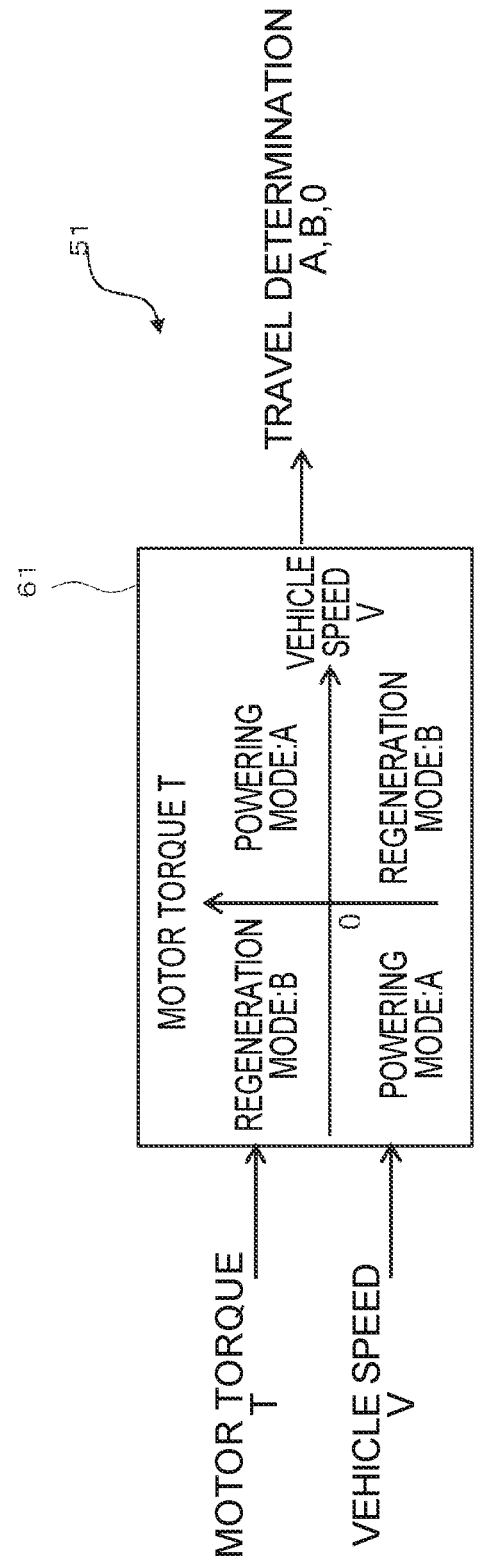
FIG. 5 is a block diagram for illustrating functionality of a travel determination section.

The following description is of the control of each of apparatuses including the DC-DC converter 21 by the controller 51. FIG. 4 is a block diagram illustrating the control of each apparatus by the controller 51, and FIG. 5 is a block diagram for illustrating functionality of a travel determination section 61 illustrated in FIG. 4. As illustrated in FIG. 4, the controller 51 outputs a chopper drive instruction, a DC/DC duty* instruction and a second generator torque instruction to control each apparatus. The following is a detailed description.

Output of Chopper Drive Instruction

As illustrated in FIG. 5, a travel determination section 61 determines the travel mode of the dump truck 100 based on the torque T and the vehicle speed V, the torque T being output from the torque sensors T1, T2 which detect torque of the traveling motors 10L, 10R, the vehicle speed V being output from the speed sensors S1, S2 which detect a vehicle speed of the dump truck 100. If the vehicle speed V is positive and also the toque T is positive or if the vehicle speed V is negative and also the torque T is negative, the travel determination section 61 determines that the travel mode is the powering mode, and the travel determination section 61 outputs a powering mode A. If the vehicle speed V is positive and also the toque T is negative or if the vehicle speed V is negative and also the torque T is positive, the travel mode is determined to be the regeneration mode, and the travel determination section 61 outputs a regeneration mode B. If the vehicle speed V is zero, this corresponds to a condition where the dump truck 100 stops or where the traveling motors 10L, 10R of the dump truck 100 on a slope generate only torque T, so that the travel determination section 61 outputs zero.

In this manner, the travel determination section 61 determines based on the torque T of the traveling motors 10L, 10R and the vehicle speed V of the dump truck 100 whether a current travel mode of the dump truck 100 is the powering mode corresponding to the normal traveling state or the regeneration mode corresponding to the traveling state where the regenerative power is generated.

As illustrated in FIG. 4, a resistor drive determination section 71 connected to the travel determination section 61 is connected to the first voltage detector 17 which detects the voltage of the high voltage DC line 18. The resistor drive determination section 71 holds a fourth threshold voltage value (fourth threshold value) $V_{M1}$ that is predefined for driving of the chopper 15. If the output of the travel determination section 61 is the regeneration mode B and also a voltage value (first voltage value) $V_{HV}$ of the first voltage detector 17 exceeds $V_{M1}$ ($V_{HV}>V_{M1}$), the resistor drive determination section 71 outputs 1.

If the output of the travel determination section 61 is the powering mode A or zero or if a voltage value $V_{HV}$ of the first voltage detector 17 is equal to or less than $V_{M1}$ ($V_{HV} \leq V_{M1}$), the resistor drive determination section 71 outputs zero. If the output of the resistor drive determination section 71 is 1, the controller 51 outputs a chopper drive instruction to start the chopper 15. Thus, the regenerative power is consumed through the grid resistance box 16. Meanwhile, if the output of the resistor drive determination section 71 is zero, the controller 51 outputs a chopper stop instruction to stop the chopper 15.

Output of DC/DC Duty* Instruction

A switching section 74 is connected to the travel determination section 61 and receives as input: a travel determination result (A, B, 0) from the travel determination section 61; a torque instruction value T* for the traveling motors 10L, 10R; and rotational speeds ω of the traveling motors 10L, 10R. From the torque instruction value T* for the traveling motors 10L, 10R and the detected rotational speeds ω, the switching section 74 computes a required power P(=T×ω) for the traveling motors 10L, 10R, and the switching section 74 outputs the required power P and the information received from the travel determination section 61.

A first threshold determination section 72 is connected to the switching section 74. If the output of the travel determination section 61 is A and the powering mode, the first threshold determination section 72 outputs a first threshold voltage instruction value (first voltage value) $V_{A*}$ required for the high voltage DC line 18, based on a pre-held torque-rotational speed table for the traveling motors 10L, 10R in the powering mode.

A second threshold determination section 73 is connected to the switching section 74. If the output of the travel determination section 61 is B and the regeneration mode, the second threshold determination section 73 outputs a second threshold voltage instruction value (second threshold value) $V_{B*}$ required for the high voltage DC line 18, based on a pre-held torque-rotational speed table for the traveling motors 10L, 10R in the regeneration mode.

A DC-DC converter drive determination section 75 is connected to the first threshold determination section 72 and the second threshold determination section 73, and receives as input the calculated first threshold voltage instruction value $V_{A*}$, the calculated second threshold voltage instruction value $V_{B*}$, and the voltage value $V_{HV}$ which is the output of the first voltage detector 17 of the high voltage DC line 18. If the voltage value $V_{HV}$ of the first voltage detector 17 of the high voltage DC line 18 exceeds $V_{A*}$ or $V_{B*}$ ($V_{HV}>V_{A*}$ or $V_{B*}$), the DC-DC converter drive determination section 75 outputs 1. Meanwhile, if the voltage value $V_{HV}$ of the first voltage detector 17 of the high voltage DC line 18 is equal to or less than $V_{A*}$ or $V_{B*}$ ($V_{HV} \leq V_{A*}$ or $V_{B*}$), the DC-DC converter drive determination section 75 outputs zero. The DC-DC converter drive determination section 75 also pre-holds a maximum voltage value $V_{M2}$, and if the voltage value $V_{HV}$ of the first voltage detector 17 of the high voltage DC line 18 is equal to or greater than $V_{M2}$ ($V_{HV} \geq V_{M2}$), the DC-DC converter drive determination section 75 outputs zero.

A DC-DC converter voltage control section 91 includes a subtracter 82, a PI control section 83 and a limiter 84. The subtracter 82 receives as input a voltage value (second voltage value) $V_{LV}$ which is the output of the second voltage detector 37 of the auxiliary device DC line 38, and a voltage instruction value $V_{LV*}$ for the auxiliary device DC line 38. The subtracter 82 performs a subtraction between the voltage instruction value $V_{LV*}$ and the voltage value $V_{LV}$ of the second voltage detector 37, and outputs a voltage deviation $\Delta V_{LV}$ to the PI control section 83. The PI control section 83 outputs to the limiter 84 a Duty value at which the voltage deviation $\Delta V_{LV}$ becomes zero. The limiter 84 has a function of placing a limit to a Duty* value output from the PI control section 83.

If the Duty* value output from the PI control section 83 is equal to or greater than a maximum limiter value Duty_max (Duty* ≥ Duty_max), the limiter 84 outputs Duty_max to a DC-DC converter control section 87. However, if the Duty value output from the PI control section 83 is equal to or less than a minimum limiter value Duty_min (Duty* ≤ Duty_min), the limiter 84 outputs Duty_min to the DC-DC converter control section 87. If the Duty* value output from the PI control section 83 falls within limits of values of the limiter 84 (Duty_min<Duty*<Duty_max), the limiter 84 outputs to the DC-DC converter control section 87 the Duty* value output from the PI control section 83.

Also, the voltage value (second voltage value) $V_{LV}$ which is the output of the second voltage detector 37 of the auxiliary device DC line 38 is input to a third threshold determination section 81. The third threshold determination section 81 pre-holds a maximum voltage value (third threshold value) $V_C$ for the auxiliary device DC line 38. The third threshold determination section 81 performs a comparison between the maximum voltage value $V_C$ for the auxiliary device DC line 38 and the voltage value $V_{LV}$ of the second voltage detector 37 of the auxiliary device DC line 38. Then, if the voltage value $V_{LV}$ is equal to or greater than the maximum voltage value $V_C$ for the auxiliary device DC line 38 ($V_{LV} \geq V_C$), the third threshold determination section 81 outputs zero, whereas if the voltage value $V_{LV}$ is less than the maximum voltage value $V_C$ for the auxiliary device DC line 38 ($V_{LV}<V_C$), the third threshold determination section 81 outputs 1.

The DC-DC converter control section 87 receives as input the output of the DC-DC converter drive determination section 75, the output of the limiter 84 and the output of the third threshold determination section 81. If either one of the condition where the DC-DC converter drive determination section 75 outputs zero or the condition where the third threshold determination section 81 outputs zero is satisfied, the DC-DC converter control section 87 outputs zero to stop the driving of the DC-DC converter 21. If the DC-DC converter drive determination section 75 outputs 1 and also the third threshold determination section 81 outputs 1, the DC-DC converter control section 87 outputs the output value of the limiter 84 (i.e., Duty* value) to drive the DC-DC converter 21.

Output of Second Generator Torque Instruction

A second generator torque control section 92 includes a subtracter 82, a PI control section 85 and a limiter 86. The subtracter 82 receives as input a voltage value $V_{LV}$ which is the output of the second voltage detector 37 of the auxiliary device DC line 38, and a voltage instruction value $V_{LV*}$ for the auxiliary device DC line 38. The subtracter 82 performs a subtraction between the voltage instruction value $V_{LV*}$ and the voltage value $V_{LV}$, and outputs a voltage deviation $\Delta V_{LV}$ to the PI control section 85.

The PI control section 85 outputs to the limiter 86 a torque instruction value $T_{2*}$ at which the voltage deviation $\Delta V_{LV}$ becomes zero. The limiter 86 has a function of placing a limit to a torque instruction value $T_{2*}$ output from the PI control section 85. If the torque instruction value $T_{2*}$ output from the PI control section 85 is equal to or greater than a maximum limiter value T_max ($T_{2*} \geq$ T_max), the limiter 86 outputs T_max. However, if the torque instruction value $T_{2*}$ output from the PI control section 85 is equal to or less than a minimum limiter value T_min ($T_{2*} \leq$ T_min), the limiter 86 outputs T_min. If the torque instruction value $T_{2*}$ output from the PI control section 85 falls within limits of values of the limiter 86 (T_min<$T_{2*}$<T_max), the limiter 86 outputs the torque instruction value $T_{2*}$ output from the PI control section 85. In compliance with the torque instruction value $T_{2*}$ output from the limiter 86, the second generator 31 generates electric power by the engine 11.

Figure 6:
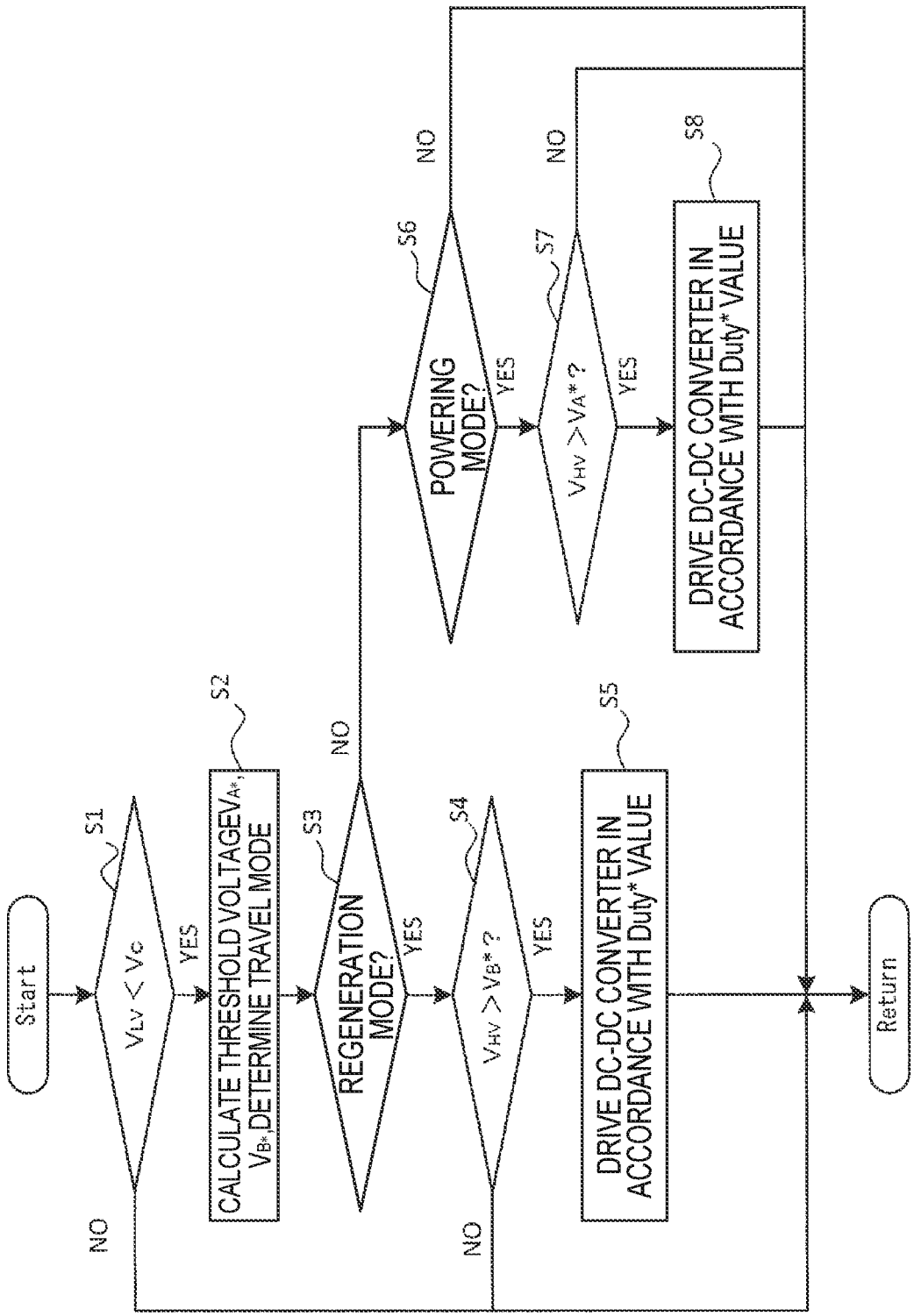
FIG. 6 is a flowchart illustrating steps of controlling the DC-DC converter by the controller.

Next, the control flow of the controller 51 is described. FIG. 6 is a flowchart illustrating steps of controlling the DC-DC converter 21 by the controller 51. As illustrated in FIG. 6, the controller 51 determines whether or not the voltage value $V_{LV}$ of the auxiliary device DC line 38 is less than the maximum voltage value (third threshold voltage) $V_C$ for the auxiliary device DC line 38 (S1). If $V_{LV}$ is less than $V_C$ (YES at S1), the controller 51 determines from the torque T of the traveling motors 10L, 10R and the vehicle speed V of the dump truck 100 whether the travel mode of the dump truck 100 is the powering mode or the regeneration mode, and the controller 51 calculates a voltage threshold value (a first threshold voltage instruction value $V_{A*}$, a second threshold voltage instruction value $V_{B*}$) for the high voltage DC line 18 (S2).

If the travel mode is the regeneration mode (YES at S3), the controller 51 determines whether or not the voltage value $V_{HV}$ of the high voltage DC line 18 is greater than the second threshold voltage instruction value $V_{B*}$ (S4). If it is greater (YES at S4), the controller 51 drives the DC-DC converter 21 in accordance with the Duty* value in the regeneration mode (S5). Meanwhile, if the travel mode is the powering mode (YES at S6), the controller 51 determines whether or not the voltage value $V_{HV}$ of the high voltage DC line 18 is greater than the first threshold voltage instruction value $V_{A*}$ (S7). If it is greater (YES at S7), the controller 51 drives the DC-DC converter 21 in accordance with the Duty* value in the powering mode (S8). It is noted that if NO in S4, NO in S6, and NO in S7, the controller 51 does not drive (stops) the DC-DC converter 21.

Traveling State of Dump Truck 100 and Operation of Each Apparatus

Figure 7:
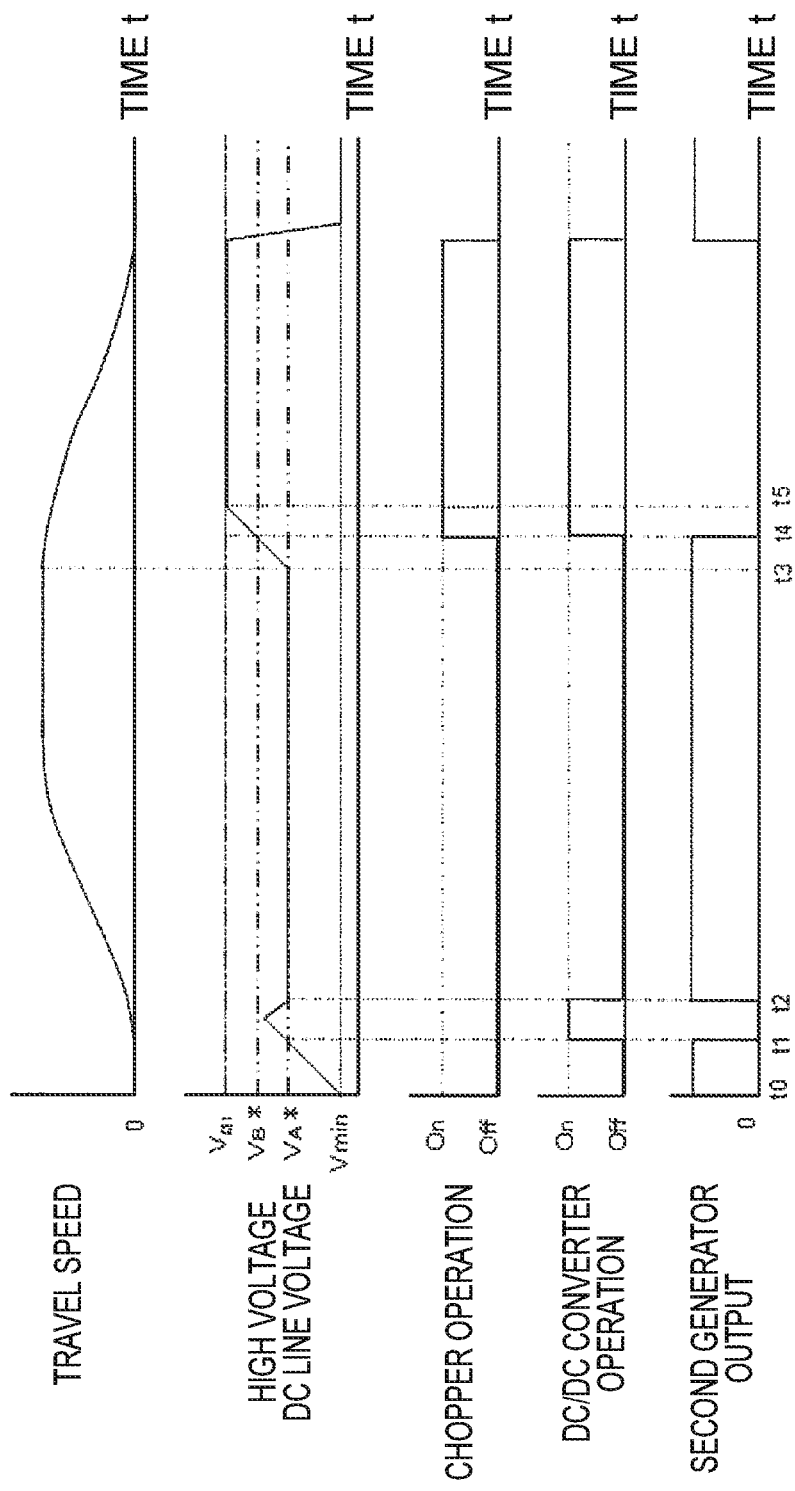
FIG. 7 is a time chart illustrating a traveling state of a dump truck and timing for operating each apparatus.

Next, the operation of each apparatus according to the traveling state of the dump truck 100 is described. FIG. 7 is a time chart illustrating the traveling state of the dump truck 100 and timing for operating each apparatus.

Time t0 To t1

Upon the dump truck 100 starting to travel, the traveling motor inverters 13L, 13R drive, and the traveling motors 10L, 10R are driven, so that the first generator 12 generates electric power, and the high voltage DC line 18 rises in voltage.

Time t1 To t2

While the dump truck 100 is traveling, when the first generator 12 generates a larger amount of power than required to drive the traveling motors 10L, 10R, the voltage of the high voltage DC line 18 increases beyond the voltage instruction value required to drive the traveling motors. At this time, the dump truck is in the powering mode and also the detected voltage of the high voltage DC line exceeds the first threshold voltage instruction value $V_{A*}$, so that the DC-DC converter 21 is driven. The DC-DC converter 21 provides surplus power generated by the first generator 12, to the auxiliary device DC line 38. At this time, the output of the second generator 31 reduces.

Time t2 To t3

The detected voltage of the high voltage DC line 18 is equal to the first threshold voltage instruction value $V_{A*}$, and the DC-DC converter 21 stops operating.

Time t3 To t4

Upon the dump truck 100 starting to decelerate, the dump truck 100 enters the regeneration mode. When the voltage of the high voltage DC line 18 exceeds the second threshold voltage instruction value $V_{B*}$ which is calculated from the rotational speeds ω and the torque instruction value T* for the traveling motors 10L, 10R, the DC-DC converter 21 drives. The DC-DC converter 21 provides to the auxiliary device DC line 38 the regenerative power from the traveling motors 10L, 10R. At this time, the output of the second generator 31 reduces.

Time t4 To t5 when the voltage of the high voltage DC line 18 reaches the maximum voltage value $V_{M1}$ by the regenerative power from the traveling motors 10L, 10R, the chopper 15 drives to control the voltage of the high voltage DC line 18 to be prevented from exceeding the maximum voltage value $V_{M1}$.

Advantageous Effects

As described above, according to the first embodiment, when the traveling motors 10L, 10R are in the regeneration mode, without use of a battery for the high voltage DC line 18, the electric power generated in retarding (during braking by retarder brake) can be consumed at the grid resistance box 16. And, because of the unnecessity of mounting a battery in the high voltage DC line 18, a reduction in weight of the dump truck 100 can be achieved.

Also, the regenerative power can be consumed irrespective of the magnitude of power generated during retarding and the rate of output variations, and also providing a portion of the electric power of the retarder to the auxiliary device DC line 38 via the DC-DC converter 21 enables the consumption of the regenerative power by the auxiliary device DC line 38.

Further, when the traveling motors 10L, 10R are in the powering mode, a portion of the energy generated by the engine 11 and the first generator 12 can be provided to the auxiliary device DC line 38 via the DC-DC converter 21, and a rise in voltage in the high voltage DC line 18 due to the surplus power during the powering can be reduced. This enables a reduction in output of the second generator 31 as well as of the engine 11, which in turn contributes to improved fuel efficiency of the dump truck 100 and improved safety of the dump truck 100.

Also, in the first embodiment, because a battery is not mounted in the first electric circuit C1, the DC-DC converter 21 is able to be driven to provide the surplus power from the first electric circuit C1 to the second electric circuit C2 immediately (without waiting for the completion of charging to a battery) every time the travel mode of the dump truck 100 is switched from the powering mode to the regeneration mode or vice versa. This may provide further effective use of energy as compared with the conventional art. In short, by switching the operation of the DC-DC converter 21 depending on the travel mode, the regenerative power can be immediately provided to the auxiliary devices for consumption.

Figure 8:
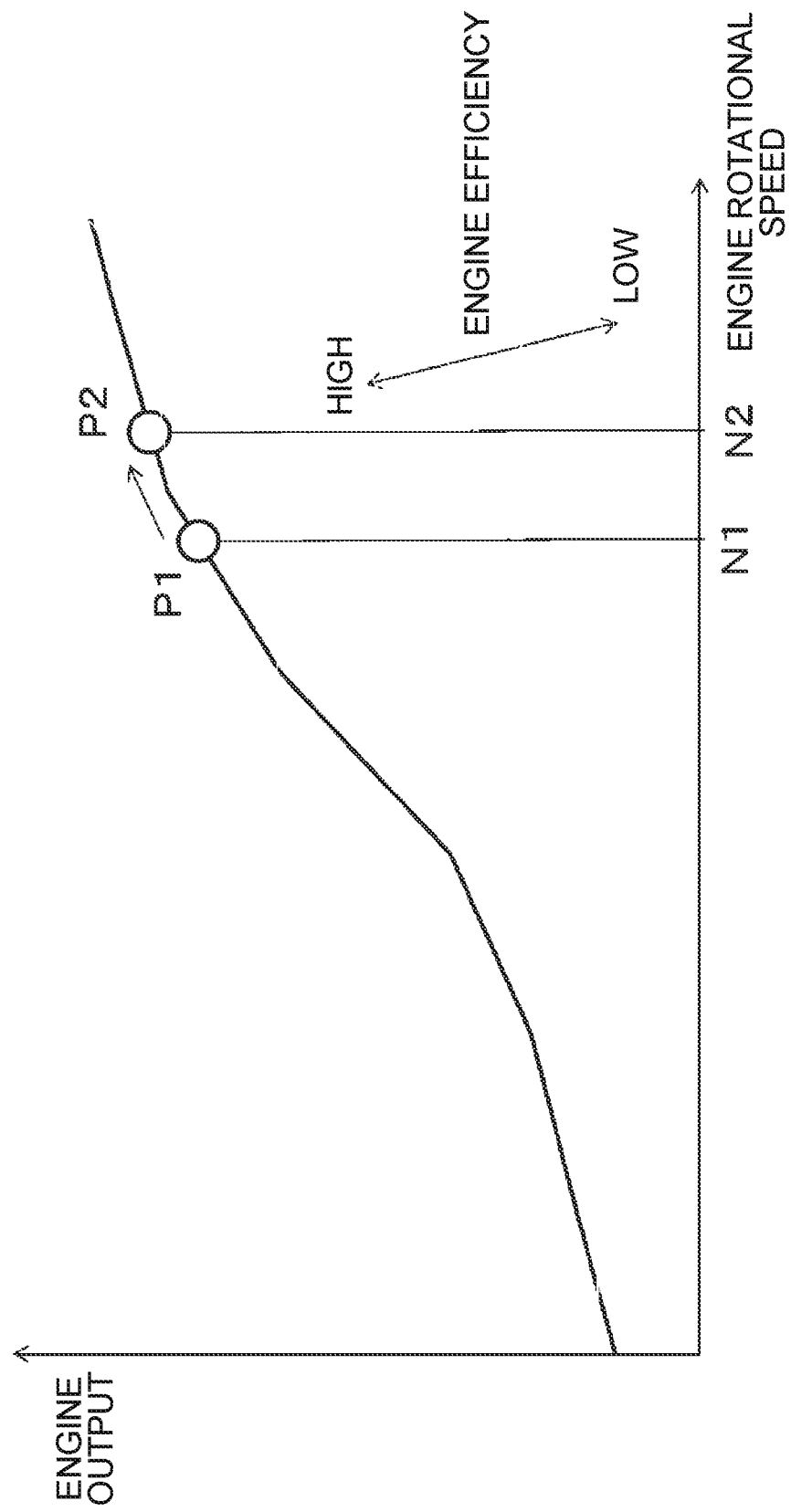
FIG. 8 is a characteristic graph showing the relationship between engine rotational speed and engine output.

Further, in the first embodiment, because the travel determination section 61 is configured to determine the travel mode of the dump truck 100, the controller 51 is able to control the engine rotational speed with consideration given to engine efficiency. A description is given with reference to a characteristic graph between engine rotational speed and engine output illustrated in FIG. 8. Because the engine efficiency is higher at point P2 than at point P1, the controller 51 controls such that the engine rotational speed slightly increases from N1 to N2. This makes it possible to increase the engine efficiency to improve fuel efficiency. It is noted that this advantageous effect is more remarkably generated when the power regeneration system according to the present invention is applied to a wheel loader which is a work vehicle. This is because a wheel loader is repeatedly operated for so-called "V-shaped excavation".

It is noted that a destination to which the power is provided from the DC-DC converter 21 is described as the fan motors 35 in the first embodiment, but it may be a traveling motor blower or a first generator blower for blowing air to cool the traveling motors 10L, 10R or the first generator 12, or an excitation power supply for the first generator 12, all of which are not shown in the figures.

Other Examples of Travel Determination Section 61

Figure 9:
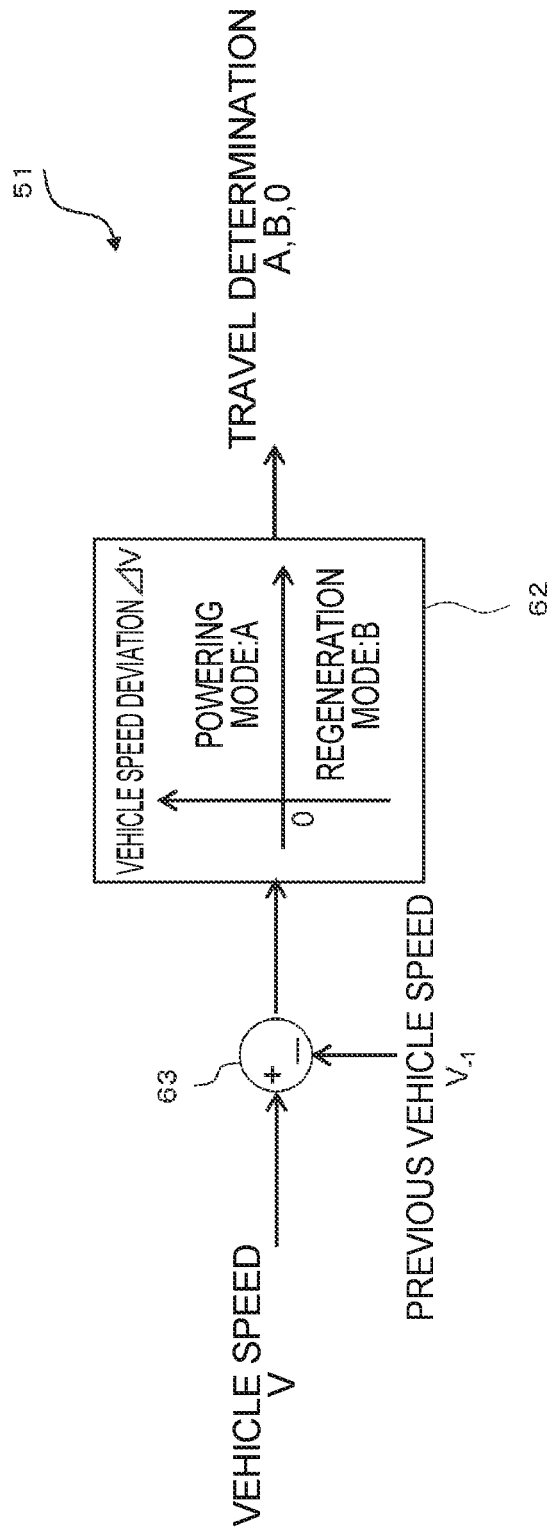
FIG. 9 is a block diagram for illustrating functionality of a travel determination section.

In the first embodiment, a travel determination section 62 illustrated in FIG. 9 may be applied instead of the travel determination section 61 illustrated in FIG. 5. FIG. 9 is a block diagram for illustrating functionality of the travel determination section 62. As illustrated in FIG. 9, the travel determination section 62 determines the travel mode of the dump truck 100 based on: a vehicle speed $V_{-1}$ at the previous sampling output from the speed sensors S1, S2 which detect a vehicle speed V of the dump truck 100 at certain time T1; and a vehicle speed V of the dump truck 100 being detected at certain time T2 (T1<T2).

When a vehicle speed deviation $\Delta V$ ($=V-V_{-1}$) which is a difference between the vehicle speed V and the vehicle speed $V_{-1}$ at the previous sampling is positive, the travel determination section 62 determines that the travel mode is the powering mode and outputs a powering mode A. When a vehicle speed deviation $\Delta V$ ($=V-V_{31\ 1}$) which is a difference between the vehicle speed V and the vehicle speed $V_{-1}$ at the previous sampling is negative, the travel determination section 62 determines that the travel mode is the regeneration mode and outputs a regeneration mode B. When the vehicle speed deviation $\Delta V$ ($=V-V_{31\ 1}$) is zero, the dump truck is at rest, so that the travel determination section 62 outputs zero. In this manner, the travel mode of the dump truck 100 is able to be determined even in the configuration of the travel determination section 62. Note that a tilting angle sensor, not shown, may be used in combination to sense a tilt of the vehicle body so that a speed reduction such as on an uphill slope or the like is not determined as the regeneration mode. It is noted that the travel determination section 62 may be used in lieu of the travel determination section 61, or alternatively may be used in combination with the travel determination section 61.

Second Embodiment

Figure 10:
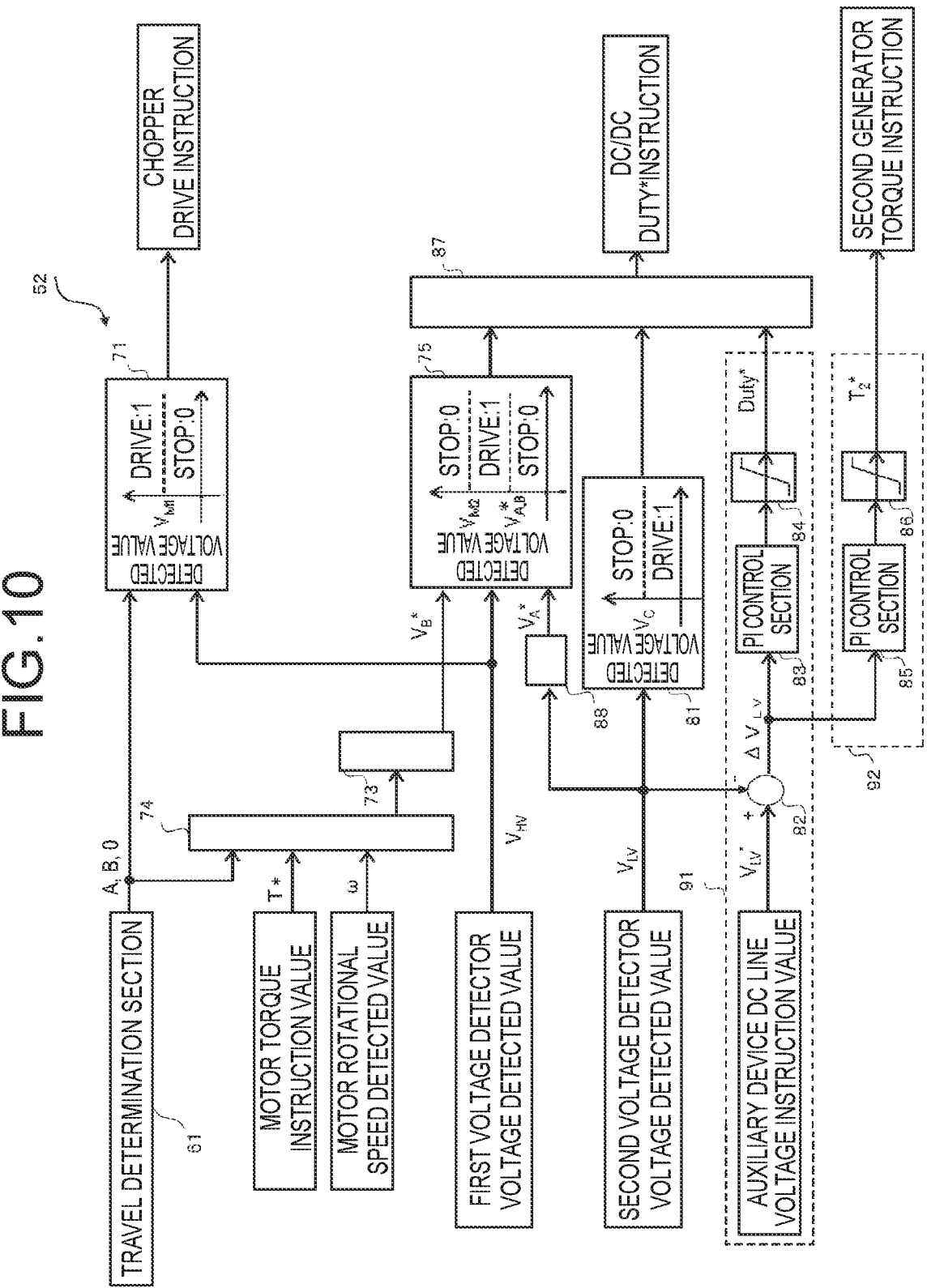
FIG. 10 is a schematic configuration diagram of a power regeneration system according to a second embodiment of the present invention.

FIG. 10 is a schematic configuration diagram of a power regeneration system according to a second embodiment of the present invention. A major difference from the first embodiment is a method of setting a first threshold voltage instruction value $V_{A*}$ in the powering mode in the DC-DC converter drive determination section 75.

As illustrated in FIG. 10, a DC-DC converter minimum drive setting section 88 receives as input a voltage value $V_{LV}$ of the auxiliary device DC line 38. Based on the incoming voltage value $V_{LV}$ of the auxiliary device DC line 38, the DC-DC converter minimum drive setting section 88 calculates a first threshold voltage instruction value $V_{A*}$ for the high voltage DC line 18 at which the voltage value $V_{LV}$ of the auxiliary device DC line 38 can be output by the DC-DC converter 21. The calculation method is presented by equation (1), in which a turn ratio of a transformer of the DC-DC converter 21 is N and a maximum Duty ratio is Duty_max.

$$V_{A*}=V_{LV} \times N/\text{Duty\_max} \quad (1)$$

Based on Equation (1), the DC-DC converter minimum drive setting section 88 outputs a calculated first threshold voltage instruction value $V_{A*}$ for the high voltage DC line 18 to the DC-DC converter drive determination section 75. The DC-DC converter drive determination section 75 is connected to the second threshold determination section 73 and the DC-DC converter minimum drive setting section 88, and receives as input the calculated first threshold voltage instruction value $V_{A*}$, the calculated second threshold voltage instruction value $V_{B*}$, and the voltage value $V_{HV}$ which is the output of the first voltage detector 17 of the high voltage DC line.

If the voltage value $V_{HV}$ of the first voltage detector 17 of the high voltage DC line 18 exceeds the first threshold voltage instruction value $V_{A*}$ or the second threshold voltage instruction value $V_{B*}$ ($V_{HV}>V_{A*}$ or $V_{B*}$), the DC-DC converter drive determination section 75 outputs 1. If the voltage value $V_{HV}$ of the first voltage detector 17 of the high voltage DC line 18 is equal to or less than $V_{A*}$ or $V_{B*}$ ($V_{HV} \leq V_{A*}$ or $V_{B*}$), the DC-DC converter drive determination section 75 outputs zero. The DC-DC converter drive determination section 75 also pre-holds a maximum voltage value $V_{M2}$, and if the voltage value $V_{HV}$ of the first voltage detector 17 of the high voltage DC line 18 is equal to or greater than $V_{M2}$ ($V_{HV} \geq V_{M2}$), the DC-DC converter drive determination section 75 outputs zero.

Traveling State of Dump Truck 100 and Operation of Each Apparatus

Figure 11:
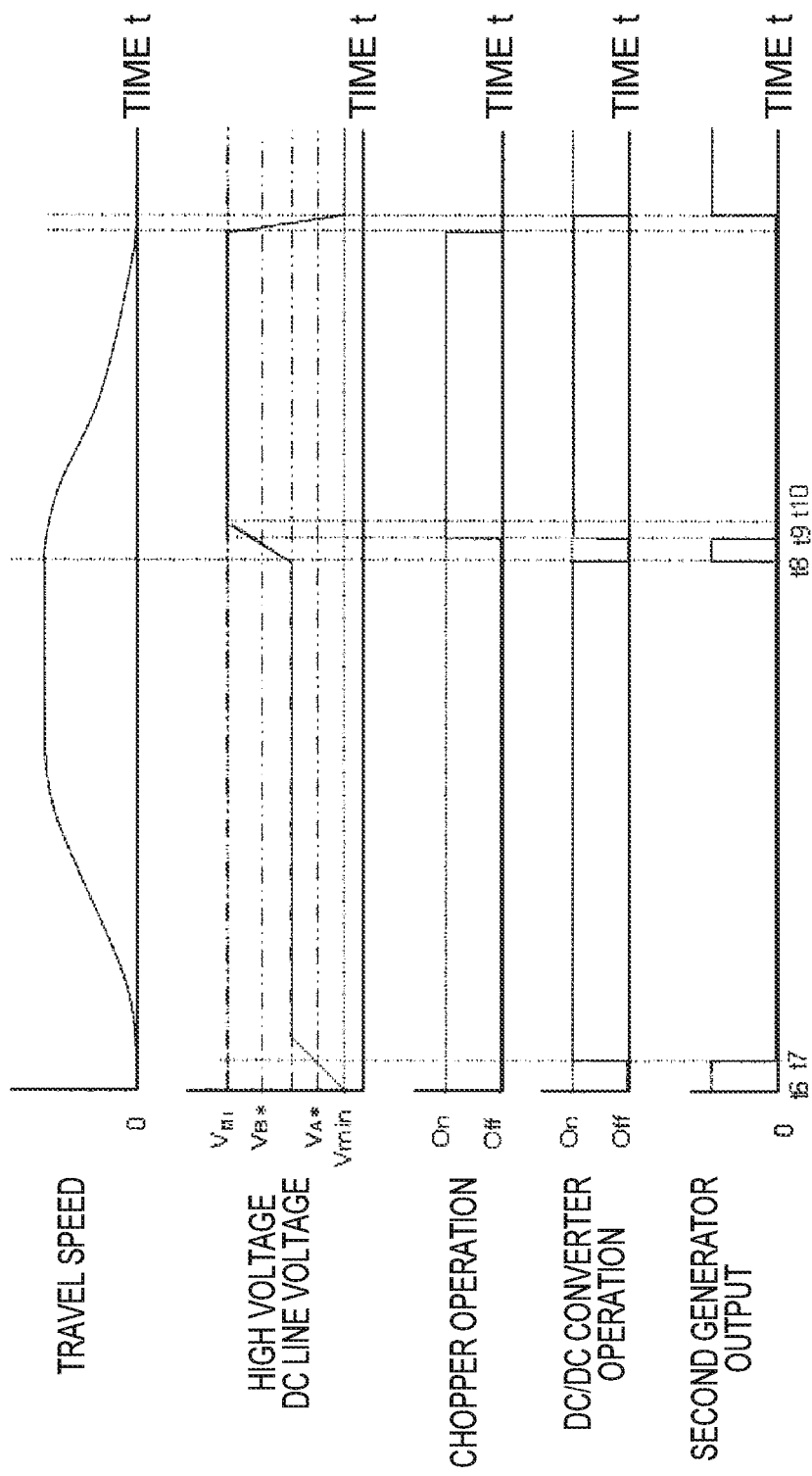
FIG. 11 is a time chart illustrating a traveling state of a dump truck and timing for operating each apparatus.

Next, the operation of each apparatus according to the traveling state of the dump truck 100 is described. FIG. 11 is a time chart illustrating the traveling state of the dump truck 100 and timing for operating each apparatus.

Time t6 To t7

Upon the dump truck 100 starting to travel, the traveling motor inverters 13L, 13R drive, and the traveling motors 10L, 10R are driven, so that the first generator 12 generates electric power, and the high voltage DC line 18 rises in voltage.

Time t7 To t8

While the dump truck 100 is traveling, the dump truck 100 is in the powering mode and also the detected voltage of the high voltage DC line 18 is equal to or greater than the first threshold voltage instruction value $V_{A*}$, so that the DC-DC converter 21 is driven. The DC-DC converter 21 provides to the auxiliary device DC line 38 surplus power generated by the first generator 12. At this time, the output of the second generator 31 reduces.

Time t8 To t9

The detected voltage of the high voltage DC line 18 is equal to the first threshold voltage instruction value $V_{A*}$, and the DC-DC converter 21 does not operate. Upon the dump truck 100 starting to decelerate, the dump truck 100 enters the regeneration mode. When the voltage of the high voltage DC line 18 exceeds the second threshold voltage instruction value $V_{B*}$ which is calculated from the rotational speeds ω and the torque instruction value T* for the traveling motors 10L, 10R, the DC-DC converter 21 drives. The DC-DC converter 21 provides to the auxiliary device DC line 38 the regenerative power from the traveling motors 10L, 10R. At this time, the output of the second generator 31 reduces.

Time t9 To t10

When the voltage of the high voltage DC line reaches the maximum voltage value $V_{M1}$ by the regenerative power from the traveling motors 10L, 10R, the chopper 15 drives so that the voltage of the high voltage DC line is controlled to be prevented from exceeding the maximum voltage value $V_{M1}$.

Advantageous Affects

As described above, according to the second embodiment, similar advantageous effects to those in the first embodiment can be generated.

It should be understood that the present invention is not limited to the embodiments described above, and various modifications are embraced. For example, the above-described embodiments have been described in detail for the purpose of providing easy understanding of the present invention, and the present invention is not necessarily limited to including all the configurations described above. For example, the present invention is applicable to various types of work vehicles such as a wheel loader, a fork lift and the like as described above, in addition to the dump truck.

LIST OF REFERENCE SIGNS 10L, 10R: Traveling motor
11: Engine
12: First generator
13L, 13R: Traveling motor inverter (first power conversion device)
14: First rectifier circuit
16: Grid resistance box (resistor)
17: First voltage detector
18: High voltage DC line
21: DC-DC converter (voltage step down converter)
31: Second generator
32: Second rectifier circuit
34: Fan motor inverter (second power conversion device)
35: Fan motor (auxiliary device)
36: Fan
37: Second voltage detector
38: Auxiliary device DC line
100: Dump truck
C1: First electric circuit
C2: Second electric circuit
$V_{HV}$: First voltage value
$V_{LV}$: Second voltage value
$V_{A*}$: First threshold voltage instruction value (first threshold value)
$V_{B*}$: Second threshold voltage instruction value (second threshold value)
$V_C$: Maximum voltage value (third threshold value)
$V_{M1}$: Fourth threshold voltage value (fourth threshold value)

The invention claimed is:

1. A power regeneration system of a work vehicle, comprising:
a first generator and a second generator that are driven by an engine;
a first electric circuit for supplying electric power generated at the first generator, to traveling motors connected to drive wheels of the work vehicle;
a second electric circuit for supplying electric power generated at the second generator, to an auxiliary device of the work vehicle;
a voltage step down converter that is connected at a high voltage side to the first electric circuit and connected at a low voltage side to the second electric circuit, the voltage step down converter providing electric power from the first electric circuit to the second electric circuit; and
a controller that determines whether a travel mode of the work vehicle is a powering mode or a regeneration mode in order to control driving of the voltage step down converter, the powering mode corresponding to a normal traveling state, the regeneration mode corresponding to a traveling state where regenerative power is generated,
wherein, if the travel mode of the work vehicle is the regeneration mode, the controller controls driving of the voltage step down converter to provide the regenerative power from the first electric circuit through the voltage step down converter to the second electric circuit, in order to drive the auxiliary device with the regenerative power,
wherein the first electric circuit includes a first rectifier circuit that is connected to the first generator, first power conversion devices that are connected at input sides to the first rectifier circuit and connected at output sides to the traveling motors, a resistor and a chopper that are connected to the input sides of the first power conversion devices, and a first voltage detector that detects a voltage in the first electric circuit,
wherein the second electric circuit includes, at least, a second rectifier circuit that is connected to the second generator, a second power conversion device that is connected at an input side to the second rectifier circuit and connected at an output side to the auxiliary device of the work vehicle, and a second voltage detector that detects a voltage in the second electric circuit, and
wherein, if the travel mode is the powering mode and a first voltage value detected at the first voltage detector is greater than a first threshold value, and if the travel mode is the regeneration mode and the first voltage value is greater than a second threshold value, the controller drives the voltage step down converter to provide electric power from the first electric circuit to the second electric circuit.

2. The power regeneration system of the work vehicle according to claim 1, wherein the first threshold value and the second threshold value are respectively values defined based on a relationship between rotational speed and torque of the traveling motor.

3. The power regeneration system of the work vehicle according to claim 1, wherein, if the travel mode is the regeneration mode and the first voltage value is greater than a fourth threshold value, the controller drives the resistor for consumption of electric energy.

4. The power regeneration system of the work vehicle according to claim 1, wherein, if a second voltage value detected at the second voltage detector is equal to or greater than a third threshold value, the controller stops driving of the voltage step down converter.

5. The power regeneration system of the work vehicle according to claim 1,
wherein the controller sets the first threshold value in the powering mode on the basis of a second voltage value detected at the second voltage detector, and
if the first voltage value detected at the first voltage detector is greater than the first threshold value in the powering mode, the controller outputs a driving instruction for the voltage step down converter.

* * * * *